United States Patent
Wagner et al.

[15] 3,672,271
[45] June 27, 1972

[54] AUTOMATIC EXPOSURE CONTROL FOR PHOTOGRAPHIC APPARATUS

[72] Inventors: Karl Wagner, Ottobrunn; Klaus Nicolay, Gruenwald, both of Germany

[73] Assignee: AGFA-Gevaert Aktiengesellschaft, Leverkusen, Germany

[22] Filed: Aug. 7, 1970

[21] Appl. No.: 62,035

[30] Foreign Application Priority Data

Aug. 20, 1969  Germany ..................... P 19 42 285.6

[52] U.S. Cl. ........................... 95/10 CT, 95/10 C, 95/53 EB, 95/64 R
[51] Int. Cl. ................................................. G03b 7/14
[58] Field of Search ................. 95/64 D, 10 C, 10 CE, 10 CT

[56] References Cited
UNITED STATES PATENTS

3,433,140  3/1969  Wick et al. .......................... 95/10 C

*Primary Examiner*—Samuel S. Matthews
*Assistant Examiner*—Russell E. Adams, Jr.
*Attorney*—Michael S. Striker

[57] ABSTRACT

A moving-coil instrument having a pointer is connected diagonally of an electrical bridge of which two arms are photoconductors and respectively exposed to direct scene light and to scene light passing through the camera objective. The two photoconductors generate signals in response to the different light intensities, the moving-coil instrument operatively taking a position which is a function of the difference of the two signals to adjust the diaphragm opening during exposure while the photoconductor which receives direct scene light is switched into a time delay control circuit which determines the time of exposure.

13 Claims, 2 Drawing Figures

INVENTOR
Dr. KARL WAGNER
KLAUS NICOLAY
BY

AUTOMATIC EXPOSURE CONTROL FOR PHOTOGRAPHIC APPARATUS

BACKGROUND OF THE INVENTION

The invention relates to photographic apparatus having built-in automatic exposure control, a photosensitive means being exposed to light through the picture-taking objective and a blade diaphragm being operated at the beginning of the exposure.

SUMMARY OF THE INVENTION

An objective of the invention is to provide an arrangement for altering the diaphragm aperture automatically and in dependence on the lighting conditions after the mirror has pivoted out of the path of the light through the objective. Once the mirror has pivoted, the photosensitive means are no longer exposed to scene light through the objective. In a very simple way, the invention enables the correct setting of the diaphragm aperture.

The invention essentially comprises a picture-taking objective, adjustable diaphragm means for controlling the amount of light incident on the light-sensitive film, and exposure control means comprising an electric circuit having a light-measuring first portion and a second portion operative to close the shutter of the photographic apparatus, the first portion including electric bridge arms of first and second photosensitive means connected together at a common junction and respectively exposed to scene light through said objective and to direct scene light to provide each a voltage proportional to the light incident upon it, and electric means connected in the bridge to respond to the difference in voltages between said first and second photosensitive means to adjust said diaphragm means as a function of scene brightness.

The novel features which are considered as characteristic for the invention are set forth in particular in the appended claims.

The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
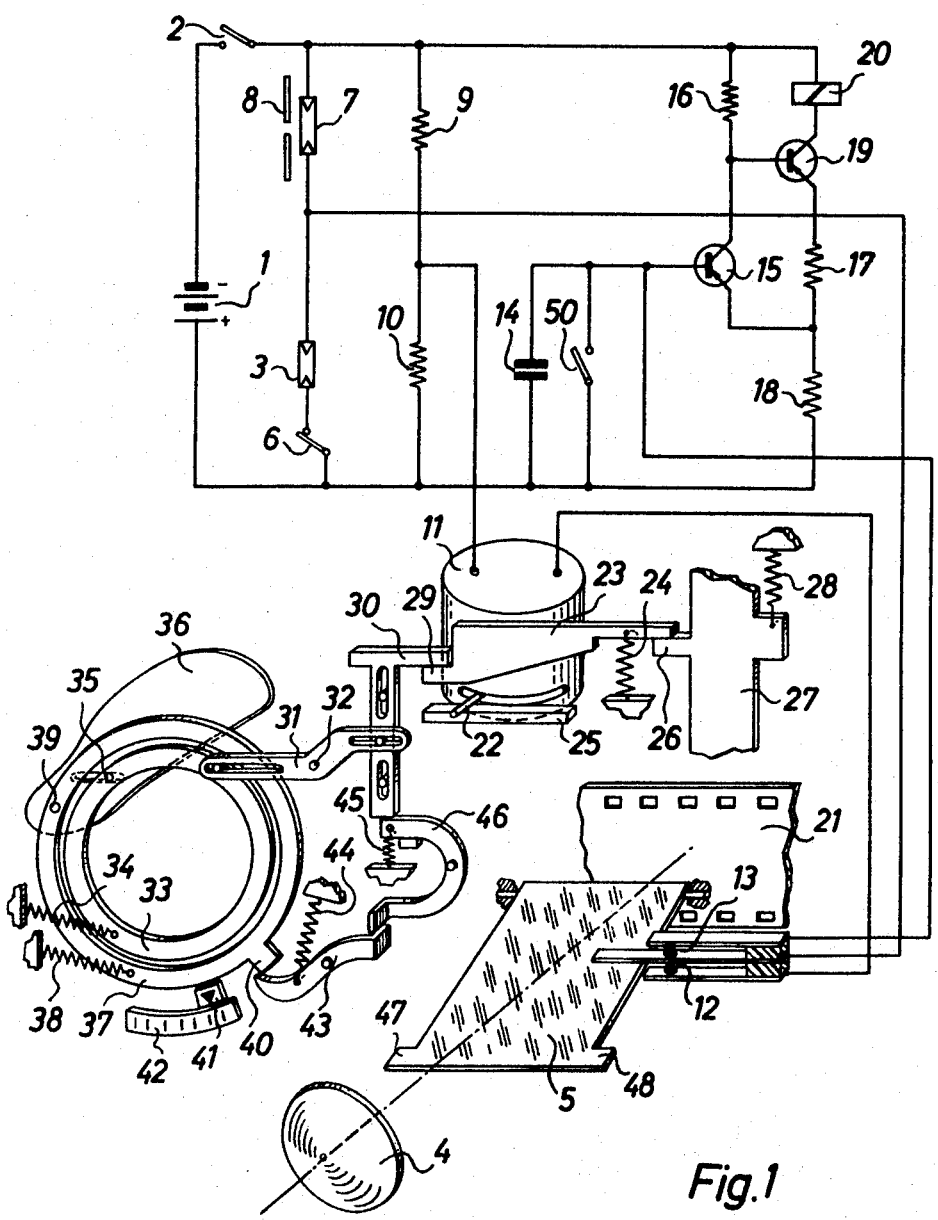
FIG. 1 schematically shows one embodiment of the invention.

A voltage source 1 is connected by an operating switch 2 to the electronic exposure arrangement. A photoconductor 3 is exposed to light that passes through the objective 4 and is reflected by a mirror 5. A switch 6 connects the photoconductor 3 to the positive pole of the voltage source 1. The photoconductor 3 forms one arm of a bridge. Another arm of the bridge is formed by a photoconductor 7, which is exposed to direct scene light. An auxiliary adjustable diaphragm 8 is arranged in front of the photoconductor 7. The other two arms of the bridge are comprised of resistors 9 and 10 of equal value. A moving-coil instrument 11 is connected across one diagonal of the bridge. Before the exposure time is automatically determined, the one contact 12 of a switch 12, 13 connects the moving-coil instrument 11 to the common junction between the two resistors 9 and 10. To automatically determine the exposure time, the contact 13 connects the photoconductor 7 in series with a capacitor 14 forming part of a shutter control means. This capacitor is connected to the base of a transistor 15, the collector circuit of which contains a resistor 16. The emitter of transistor 15 is connected to the common junction between the two resistors 17 and 18, which are connected in the emitter circuit of a further transistor 19. The collector of transistor 15 is connected to the base of transistor 19. A shutter-control magnet 20 is connected in the collector circuit of transistor 19. The film that is to be exposed is denoted by the reference numeral 21. The pointer, or output member, 22 of the moving-coil instrument 11 is scanned by a scanning member 23. The scanning member 23 is biased by a spring 24. The pointer 22 has a support 25. The scanning member 23 is held in its starting position by a projection 26 of a release element 27. The release 27 is biased by a spring 28.

A projection 29 of the scanning member 23 connects the latter to a motion-transmitting lever arrangement 30 and 31. The lever 31 is pivotally arranged on a pin 32. A slot-and-pin arrangement connects one end of the lever 31 to the inner ring 33 of the adjustable diaphgragm. The inner diaphragm 33 is biased by a spring 34. A pin 35 on the inner ring projects through a slot in a blade 36 of the diaphragm. In order to preserve the simplicity of the FIGURE, only one diaphragm blade is shown. The outer ring 37 is also biased by a spring 38. The blade 36 is mounted free to pivot on a pin 39 mounted on the outer ring 37.

The outer diaphragm ring 37 has a projection 40 that cooperates with an automatically or manually adjustable stop 41. A diaphragm scale is denoted by the reference numeral 42.

The outer ring 37 is held in position by a click 43 that engages the projection 40. The click is biased by a spring 44.

The lever 30 is held in its starting position by a further click 46, which is biased by a spring 45. The clicks 43 and 46 are pivoted by a projection 47 provided on the mirror 5.

Another projection 48 on the reflector 5 operates the switch 12, 13.

The arrangement just described operates in the following manner. When the release 27 is operated, the operating switch 2 is first of all closed in a manner not shown. Consequently, the voltage source 1 is connected to the electronic exposure control. The stop is then manually or automatically suitably positioned in a way not shown. If the signals or resistances of the two photoconductors 3 and 7 are the same, there is no voltage on the moving-coil instrument 11, so that the pointer 22 remains in its starting position. A holding member, not shown, prevents the pointer 22 from moving during further operation of the release 27.

In a manner not shown, the release 27 frees the reflector 5, so that it pivots out of the light path that passes through the objective 4. The reflector projection 48 opens the contact 12, disconnecting the moving-coil instrument 11 from the bridge, and closes the contact 13, thereby connecting the photoconductor 7 to the capacitor 14, in order to measure the intensity of the direct scene light falling on the photoconductor 7. The release 27 also opens the switch 6, in a way not shown, thereby disconnecting the photoconductor 3 from the bridge. The reflector projection 47 pivots the click 43, so that the outer diaphragm ring 37 is turned by the spring 38 until the projection 40 strikes the spot 41.

The two clicks 43 and 46 comprise a motion-transmitting means. The pivoting of the click 43 causes the clock 46 to pivot, freeing the lever 30. Since the pointer 22 of the moving-coil instrument 11 is in its starting position, the scanning member 23 cannot move down. Consequently, the inner ring 33 is not moved.

At the beginning of the exposure time, the switch 50 is opened in a manner not shown, so that the capacitor 14 can charge through the photoconductor 7. After a predetermined delay time, the transistor 15 is turned on, and, therefore, the transistor 19 is turned off. The shutter-control magnet 20 is consequently de-energized, thereby ending the exposure.

If the amount of light passing through the objective 4 is weakened, less light falls on the photoconductor 3, which therefore generates a different signal or has a larger resistance than does the photoconductor 7, so that the bridge is no longer balanced. There is now a voltage on the moving-coil instrument 11, the size of this voltage being dependent on the difference between the resistances of the two photoconductors 3 and 7.

Since the photoconductor 7 cannot take into account the weakening of the light passing through the objective 4, it is essential that a correction be made. The diaphragm opening as determined by the manually or automatically set stop 41 must be corrected in dependence on the difference between the resistances of the two photoconductors 3 and 7. That is, the diaphragm blades must be either closed or open.

The arrangement of the invention operates in the same manner as before until the outer ring 37 is freed. The pointer 22, which has been moved to the right an amount depending on the voltage across the moving-coil instrument 11, is held in position by a holding member, not shown. As soon as the click 46 frees the lever 30 and the scanning member 23 moves downward against the stopped pointer 22, the lever 30 pivots the lever 31. Consequently, the inner diaphragm ring 33 is turned in a direction opposite to that in which the outer ring 37 was turned. As a result, the diaphragm opening, which had been closed a certain amount by the movement of the outer ring 37, is enlarged by an amount corresponding to the movement of the pointer 22 from its starting position. The diaphragm 8 for the photoconductor 7 is coupled to the blade diaphragm for the objective 4. In this way, setting of the diaphragm opening is taken into account for automatically determining the exposure time.

Figure 1A:
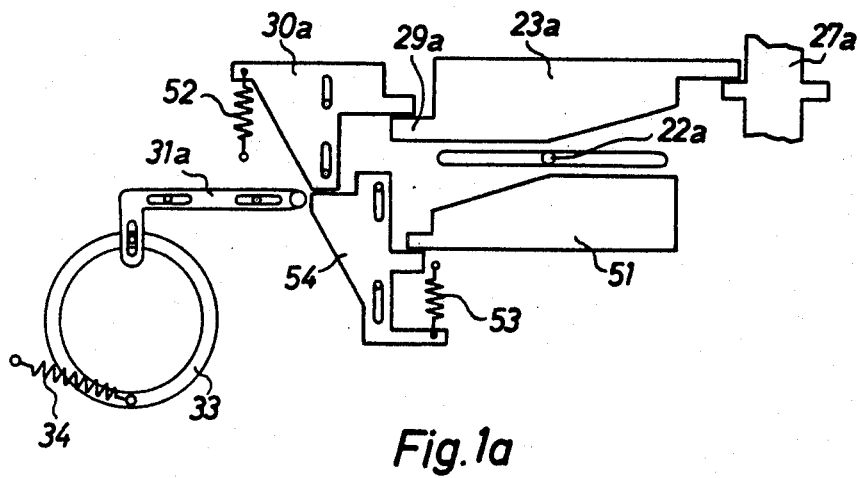
FIG. 1a shows another embodiment of the invention.

In accordance with a further embodiment of the invention, the pointer 22a of the moving-coil instrument has a center starting position. (FIG. 1a) In this case, the bottom edge of the scanning member, which faces the pointer 22a, is straight from the projection 29a to the middle of he scanning member, where it begins to rise to form the scanning face. The scanning face continues to the rightmost position that can be taken by the pointer 22a. The lever 30a shows a slant by means of which the lever 31a can be moved to the left. A spring 52 acts on the lever 30a. Due to the slant of the lever 30a, the inner diaphragm ring 33 is turned in opposite direction to the force of the spring 34. With this the diaphragm opening is increased.

In this embodiment there can be added a second scanning member 51, which moves in the direction opposite to that in which the scanning member 23a moves. This second scanning member 51 is flat from its middle to the rightmost position that can be taken by the pointer 22a. The slanting scanning face begins at the middle of the scanning member and continues as far as the left end position to which the pointer can be moved. A lever arrangement 54 is provided that cooperates with a projection on this further scanning member. This lever arrangement 54 acts on the lever 31a when the pointer 22a moves leftwards, so that the inner diaphragm ring 33 is turned in the same direction that the outer diaphragm ring 37 was turned. Consequently, the manually or automatically set diaphragm opening is closed a further precise amount. This operation is advantageous when the resistance of the photoconductor 3 is smaller than the resistance of the photoconductor 7. The lever 54 shows a slant wich, during the upward movement of the scanning member 51, causes the lever 31a to move to the right by action of the spring 34 of the inner diaphragm ring 33. With this diaphragm ring 33 is also turned to the right and the diaphragm opening is decreased. A spring acting on the lever 54 is marked 53. Further in accordance with the invention, the pointer 22, or its mirror image, can also be the pointer for the diaphragm scale.

In a still further alteration of the invention, the release 27 can operate all of the switches of the electric circuit for measuring the light and closing the camera shutter.

In accordance with the invention, the exposure time can also be determined by resistors that take into account the diaphragm setting.

It will be understood that each of the elements described above, or two or more together, may also find a useful application in other types of constructions differing from the types described above.

While the invention has been illustrated and described as embodied in an automatic exposure control for photographic apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such daptations should and are intended to be comprehended within the meaning and range of equivalence of the following claims.

what is claimed as new and desired to be protected by Letters Patent is set forth in the appended claims:

1. In a photographic apparatus, a shutter movable between open and closed positions with variable delay to furnish a range of exposure times; a picture taking objective; adjustable diaphragm means for controlling the amount of light passing through said objective and incident on the light-sensitive film; bridge means comprising two arms respectively containing first and second photosensitive means and respectively exposed to scene light through said objective and to direct scene light to provide electrical signals proportional to the intensity of the respective lights; meter means connected in said bridge means to adjust said diaphragm as a function of the difference in said signals; control means for closing said shutter for a predetermined exposure time; and switch means for switching said second photosensitive means from said bridge means into said control means, said second photosensitive means being operative to determine the exposure time furnished by said shutter while said diaphragm is adjusted as a function of said signal difference.

2. In a photographic apparatus as defined in claim 1, wherein said meter means comprises a moving-coil instrument.

3. In a photographic apparatus as defined in claim 1, wherein said bridge means further comprises two further arms respectively containing first and second equal resistance means connected together at a common junction.

4. In a photographic apparatus as defined in claim 3, wherein said first and second photosensitive means are connected together at a common junction, and said meter means is connected between said common junction of said first and second photosensitive means and said first and second resistance means.

5. In a photographic apparatus as defined in claim 1, further comprising auxiliary adjustable diaphragm means coupled to said adjustable diaphragm means and located to intercept direct scene light to said second photosensitive means.

6. In a photographic apparatus as defined in claim 1, wherein said meter means comprises an output member movable from a starting position in proportion to the difference in signals between said first and second photosensitive means, and said diaphragm means comprises blade means and first and second independently movable diaphragm blade controlling means, and further including adjustable stop means for limiting the movement of said first diaphragm blade controlling means; and adjusting means controlled by the position of said output member for moving said second diaphragm blade controlling means as a function of scene brightness.

7. In a photographic apparatus as defined in claim 6, including first motion-transmitting means for transmitting movements of said adjusting means to said second diaphragm blade controlling means.

8. In a photographic apparatus as defined in claim 6, wherein said photographic apparatus is a single-lens reflex camera, and said bridge means operates before said control means, and further including pivotal light-reflecting means normally positioned in a first position in the light path passing through said objective and pivotal to a second position out of said path to permit exposure of the light-sensitive film after operation of said bridge means; and second motion-transmitting means for normally preventing movement of said first and second diaphragm blade controlling means operated by movement of said light-reflecting means to said second position to free said first and second diaphragm blade controlling means.

9. In a photographic apparatus as defined in claim 8, wherein said second motion-transmitting means comprise first and second click means respectively normally preventing movement of said first diaphragm blade controlling means and of said first motion-transmitting means.

10. In a photographic apparatus as defined in claim 6, including two said adjusting means for respectively moving said second diaphragm blade controlling means in one of two different directions for reducing or increasing the size of the aperture of said diaphragm means.

11. In a photographic apparatus having a shutter movable between open and closed positions with variable delay to determine the exposure time, a combination comprising a picture-taking objective, adjustable diaphragm means for controlling the amount of light incident on the light-sensitive film; exposure control means comprising a electric circuit having a light-measuring first portion and a second portion operative to close the shutter; said first portion including electrical bridge means comprising two arms respectively containing first and second photosensitive means connected together at a common junction and respectively exposed to scene light through said objective and to direct scene light to provide each a signal proportional to the light incident upon it, said electric circuit second portion operating after said electric circuit first portion, electrical means connected in said bridge to respond to the difference in signals between said first and second photosensitive means to adjust said diaphragm means as a function of scene brightness; and switch means for switching said second photosensitive means out of said electrical bridge means and into said second portion of said electric circuit for operation of said electric circuit second portion.

12. In a photographic apparatus having a shutter movable between open and closed positions with variable delay to determine the exposure time, a combination comprising a picture-taking objective; adjustable diaphragm means for controlling the amount of light incident on the light-sensitive film; exposure control means comprising an electric circuit having a light measuring first portion and a second portion operative to close the shutter, said first portion including electrical bridge means comprising two arms respectively containing first and second photosensitive means connected together at a common junction and respectively exposed to scene light through said objective and to direct scene light to provide each a signal proportional to the light incident upon it, said bridge further comprising two further arms respectively containing first and second equal resistance means connected together at a common junction, said electric circuit second portion operating after the operation of said electric circuit first portion; electrical means connected in said bridge to respond to the difference in signals between said first and second photosensitive means to adjust said diaphragm means as a function of scene brightness; and switch means for disconnecting said first photosensitive means and said electrical means from said electrical bridge means after operation of said electric circuit first portion.

13. In a single-lens reflex camera having a shutter movable between open and closed positions with variable delay to determine the exposure time, a combination comprising a picture-taking objective; adjustable diaphragm means for controlling the amount of light incident on the light-sensitive film; exposure control means comprising an electric circuit having a light measuring first portion and a second portion operative to close the shutter, said fist portion including electrical bridge means comprising two arms respectively containing first and second photosensitive means connected together at a common junction and respectively exposed to scene light through said objective and to direct scene light to provide each a signal proportional to the light incident upon it, said electric circuit second portion operating after the operation of said electric circuit first portion; pivotal light-reflecting means normally positioned in a first position in the path passing through said objective and pivotal to a second position out of said path to permit exposure of the light-sensitive film after operation of said electric circuit first portion, and a plurality of switch means operated by the movement of said light-reflecting means from said first to said second position for switching said second photosensitive means out of said electrical bridge means and into said electric circuit second portion and for disconnecting said electrical means from said electrical bridge means.

* * * * *